United States Patent [19]

Alderborn et al.

[11] 4,455,275

[45] Jun. 19, 1984

[54] METHOD OF MANUFACTURING BODIES OF SILICON NITRIDE

[75] Inventors: Jan Alderborn; Hans Larker, both of Robertsfors, Sweden

[73] Assignee: ASEA AB, Sweden

[21] Appl. No.: 196,064

[22] Filed: Oct. 10, 1980

Related U.S. Application Data

[63] Continuation of Ser. No. 9,470, Feb. 1, 1979, abandoned, which is a continuation of Ser. No. 831,929, Sep. 9, 1977, abandoned, which is a continuation of Ser. No. 627,688, Oct. 31, 1975, abandoned.

[30] Foreign Application Priority Data

Nov. 11, 1974 [SE] Sweden .............................. 7414102
Jul. 4, 1975 [SE] Sweden .............................. 7507699

[51] Int. Cl.³ ............................................. B22F 3/14
[52] U.S. Cl. ........................................ 264/325; 264/332
[58] Field of Search ..................... 9/470; 264/332, 328, 264/65

[56] References Cited

U.S. PATENT DOCUMENTS

| | | | |
|---|---|---|---|
| 3,419,935 | 1/1969 | Pfeiler | 264/332 |
| 3,469,976 | 9/1969 | Iler | 264/332 |
| 3,887,411 | 6/1975 | Goodyear | 264/65 |
| 4,381,931 | 5/1983 | Hunold | 264/65 |

Primary Examiner—John Parrish
Attorney, Agent, or Firm—Lalos, Leeds, Keegan, Lett & Marsh

[57] ABSTRACT

Bodies of silicon nitride are produced by enclosing a silicon nitride powder in a gas-tight glass casing and subjecting the casing to isostatic pressure using gas as a pressure medium at a temperature of at least 1600° C. and a pressure of at least 100 MPa. The casing is a glass having a high softening point. The casing is evacuated and sealed before compressing. The product may be pre-formed by isostatic compacting at a pressure of at least 100 MPa at a temperature considerably below the sintering temperature. The casing is cooled at a rate of at most 1000° C. per hour and at a pressure of not over 10 MPa.

12 Claims, 4 Drawing Figures

METHOD OF MANUFACTURING BODIES OF SILICON NITRIDE

CROSS-REFERENCE TO RELATED APPLICATION

This is a continuation of co-pending application Ser. No. 9,470 filed Feb. 1, 1979, (now abandoned) which is a continuation of application Ser. No. 831,929 filed Sept. 9, 1977 (now abandoned), which in turn is a continuation of application Ser. No. 627,688 filed Oct. 31, 1975 (now abandoned).

BACKGROUND OF THE INVENTION

1. Field Of The Invention:

The present invention relates to a method of manufacturing bodies of silicon nitride and to a silicon nitride body produced by the method.

2. The Prior Art:

Silicon nitride, chemical formula $Si_3N_4$, is a ceramic material which has been of considerable interest in recent years as a feasible material for the construction of components which operate at high temperatures and in a corrosive atmoshperes. Contrary to most other ceramic materials having high strength, its ability to withstand thermal shock is excellent, because of its low coefficient of thermal expansion.

Applications which are of particular interest for silicon nitride include construction material for turbine wheels, rotor blades and other dynamically stressed parts for gas turbines, including gas turbines for vehicle operation, as a construction material for parts in Wankel engines as well as for a bearing material.

Products of silicon nitride are manufactured in two well known ways, either by hot-pressing or by reaction bonding.

Hot-pressed products are made are made by compressing silicon nitride powder together with sintering-promoting additives, generally magnesium oxide, in a graphite tool at temperature of about 1700–1800° C. and at a pressure which may reach 20–30 MPa. The quantity of magnesium oxide added is 0.8–5% of the weight of the silicon nitride. For hot-pressing a silicon nitride is used which at least substantially consists of silicon nitride of α-phase type and which thus only contains a small quantity of silicon nitride of β-phase type, or possibly none at all. Unlike silicon nitride of β-phase type, silicon nitride of α-phase type contains small quantities of oxygen in the molecules. During the hot-pressing, the magnesium oxide reacts to form magnesium silicate and silicon nitride of α-phase type is converted to silicon nitride of β-phase type. The formation of magnesium silicate is thought to occur because of the action of silicon dioxide which exists as a thin coating on the silicon nitride grains and also because of the action of the oxygen present in the silicon nitride of α-phase type. Generally the silicate also contains a certain amount of calcium. The magnesium silicate forms a glasslike binding phase between the silicon nitride particles. It is known that the magnesium oxide is of decisive importance for the compression and sintering process in hot-pressing and that it assists in forming a dense, sintered product which is extremely strong. It is also known that the magnesium silicate phase in the sintered product causes a reduction in the strength of the product at higher temperatures, such as temperatures of 800–900° C. and above, a reduction which does not occur with reaction-sintered silicon nitride. In order to improve the strength at high temperatures, experiments have been made using oxides other than magnesium oxide as the additive, for instance BeO, $Ce_2O_3$, $Y_2O_3$ and $La_2O_3$. It has been found that a certain improvement could be achieved with the use of $Y_2O_3$ or BeO instead of MgO, but that the reduction in strength at higher temperatures is still considerable.

Reaction-bonded silicon nitride is manufactured by producing a porous body of silicon powder which is then nitrided with nitrogen gas. The body can easily be shaped prior to nitridization, and the shape changes very little during this process. The porosity of the finished product exceeds 15%. Unlike products made from hot-pressed silicon nitride, the strength of products made from reaction-bonded silicon nitride is practically independent of temperature, at least up to temperatures of 1600° C., but the strength is considerably less than for hot-pressed silicon nitride. Reaction-bonded silicon nitride cannot therefore be used for highly stressed construction components.

SUMMARY OF THE INVENTION

The present invention relates to a method of manufacturing products from silicon nitride, these products having a strength comparable to that of hot-pressed products of silicon nitride at room temperature and which also maintain this high strength at higher temperature. The improved strength at elevated temperature is probably achieved because according to the invention the addition of magnesium oxide or any other oxide giving a silicate phase which reduces the strength at high temperatures can be avoided and also because of the satisfactory density of the product obtained which can be brought to exceed 99.5% of the theoretical density.

More specifically the present invention relates to a method of manufacturing bodies of silicon nitride by compressing silicon nitride powder or a product preformed from the powder at a temperature of at least 1600° C., characterised in that the compression is performed by means of isostatic pressing at a pressure of at least 100 MPa, using a gas as the pressure medium and with the powder or preformed powder product enclosed in a gastight casing. During this treatment at high temperature and high pressure the particles of silicon nitride are sintered together. According to the invention a compression pressure of 150–1500 MPa is preferred, especially a compression pressure of 200–300 MPa. There is no drawback in using a higher pressure than 1500 MPa with respect to the strength of the product and other properties, but the practical difficulties in maintaining such a pressure long enough at the required temperature are considerable.

The preferred temperature for the compression is 1600–1900° C. A temperature of 1700–1800° C., is particularly preferred.

The time for the compression can vary from half an hour to several hours.

Since the compression is effected by means of isostatic pressing, the products produced will have substantially the same strength in all directions, which is not the case with hot-pressed products made in graphite tools where the strength in the pressure direction and the strength perpendicular to the pressure direction are somewhat different, probably because of a certain orientation of the particles during the pressing process. Another feature of isostatic pressing is that products having complicated shapes can be made directly by pressing with scarcely any subsequent machining with tools, for instance grinding, or none at all. Since silicon nitride is extremely hard, this is of particular importance. Another important feature of isostatic pressing is that pressing dies can be avoided, and thus also the considerable problems with material, caused by the high pressures and temperatures required simultaneously.

The powder is preferably preformed to a preformed product by subjecting it to compacting, preferably arranged in a closed capsule of yielding material. The compacting may with advantage be performed without a temporary binder at a pressure of at least 100 MPa, preferably 100–1500 MPa, at room temperature or some other temperature substantially below the temperature used for the compression in connection with the sintering. The product can then be machined to the desired shape. Alternatively, conventional methods of manufacturing moulded ceramics may be used, such as slip casting, injection moulding or compression moulding. In this case the silicon nitride powder is usually mixed with a temporary binder such as methyl cellulose, cellulose nitrate or an acrylate binder, prior to compacting. After moulding, the binder may be removed by heating.

After the moulding at low temperature the preformed product is enclosed in a gastight casing, preferably a capsule of a glass such as Vycor glass or quartz glass or some other glass having sufficiently high softening point for it not to penetrate into the pores of the body to be subjected to compression. Instead of high-melting glass, another material can be used for the capsule, which is yielding at the temperatures used for the sintering. The capsule is preferably evacuated and sealed before the powder body is subjected to the pressure and temperature conditions required for the sintering. It is an advantage if, after sealing of the capsule but before the sintering process, the capsule with its contents is heated to a temperature at which the material of the capsule is plastic so that the capsule can shape itself to the contours of the preformed product.

However, it is also possible to perform the compression without preforming the silicon nitride powder, in which case the powder is poured into a capsule having the same shape, but larger dimensions than those of the finished compressed silicon nitride body.

According to an advantageous embodiment of the invention, the gastight casing comprises a glass capsule and the glass capsule with its contents is cooled after the compression at a rate of at the most 1000° C. per hour, preferably at the most 700° C. per hour. It has been found that this completely or substantially completely avoids the risk of cracks forming in the silicon nitride body being manufactured during cooling. Such a risk is greatest if the silicon nitride body is complicated in shape and has primarily to do with the difference in coefficients of thermal expansion of silicon nitride and glass. Particularly if the glass capsule is relatively thick-walled, it is also important that the pressure during the cooling is maintained at a maximum of 10 MPa, preferably maximum 1 MPa, if a satisfactory result is to be achieved. It has been found that these measures affect the mechanical properties of the glass, the glass capsule being more easily broken during the cooling process than if the cooling is not regulated and the pressure not lowered. By making the glass less strong the risk of unfavourable influence on the silicon nitride body is reduced.

The silicon nitride powder used has a powder grain size of less than $100\mu$ and a crystal size of less than $5\mu$ and may consist at least mainly of silicon nitride of $\alpha$-phase type. Silicon nitride of this type is converted to $\beta$-phase type during the sintering. The content of impurities in the form of foreign metal oxides in the silicon nitride should not exceed 0.6 percent by weight, preferably 0.3 percent by weight.

BRIEF DESCRIPTION OF THE DRAWINGS

The invention will be further explained by describing one embodiment by way of example, with reference to the accompanying drawings in which.

DESCRIPTION OF THE PREFERRED EMBODIMENTS

Figure 1:
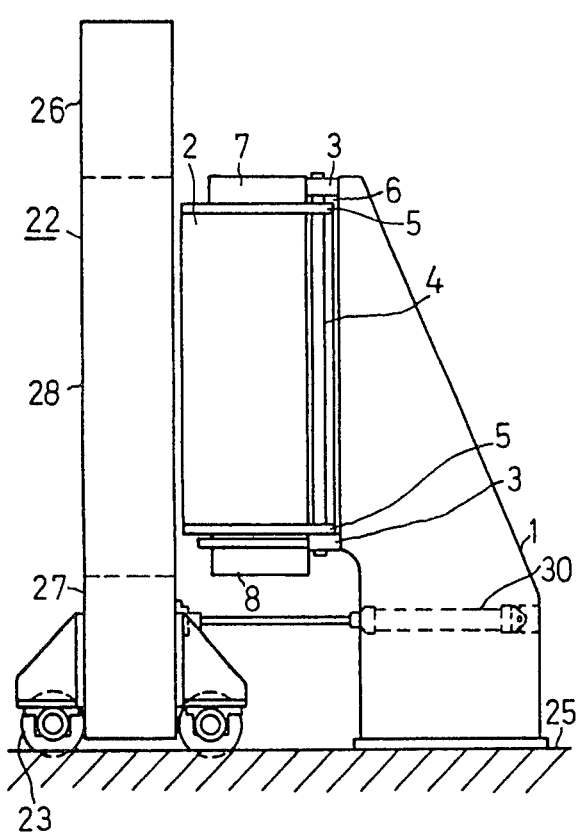
FIG. 1 shows a side view of a pressure means in which a preformed product of silicon nitride powder can be manufactured by compacting at room temperature, FIG. 2 the same means in vertical section through its centre after displacement of the press stand included, FIGS. 3a and 3b two different alternatives of a preformed product arranged in a glass capsule and FIG. 4 a high-pressure furnace in which the final compression and sintering can be performed.
Figure 2:
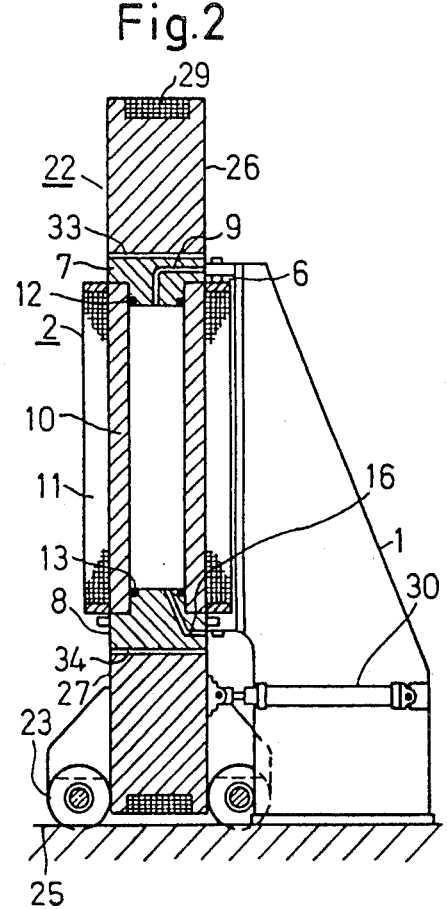

Silicon nitride powder having a grain size less than $7\mu$ and containing 0.6 percent by weight impurities (less than 0.02 percent by weight being magnesium oxide) is placed in a capsule of plastic, for instance plasticized polyvinyl chloride, or of rubber, after which the capsule is sealed and placed in a press according to FIGS. 1 and 2. In this it is subjected to compacting at 600 MPa at room temperature for a period of 5 minutes.

In FIGS. 1 and 2, 1 is a stand supporting a high-pressure cylinder 2. Two lugs 3 are provided on the stand, into which a rod 4 is inserted. The cylinder 2 is provided with two lugs 5 having bearing surfaces to fit the rod 4. The distance between the outer surfaces of the lugs 5 is less than the distance between the inner surfaces of the lugs 3. This means that the cylinder is axially displaceable a distance equal to the difference in distance between the said surface. The cylinder normally rests on the lower lug 3 and a gap 6 is thus formed between the upper lugs 3 and 5. The cylinder 2, composed of an inner tube 10 and a prestressed strip sheath 11 surrounding the tube, is closed by an upper end closure 7 and a lower end closure 8 protruding somewhat into the cylinder. These end closures are sealed to the cylinder by sealing rings 12 and 13, respectively. The upper end closure is provided with a venting channel 9. Through the channel 16 in the end closure 8 the cylinder is in communication with a pressure medium source not shown in the drawings. The press comprises a press stand 22 carried by wheels 23 running on rails 24 in the floor 25. The press stand is of the type consisting of an upper yoke 26 and a lower yoke 27 and a pair of spacers 28, held together by a prestressed strip sheath 29. The press stand is moved between the positions shown in FIG. 1 and 2 by means of an operating cylinder 30. The opening in the press stand is somewhat higher than the distance between the end surface of the end closures when fully inserted. The cylinder is fixed at such a height that the clearances 33 and 34 between the press-stand yokes and the end closures of the cylinder are substantially the same.

The press operates as follows: The cylinder 2 is loaded, in this case with the capsule containing the silicon nitride powder, the upper end closure 7 is inserted and the press stand moved from the position shown in FIG. 1 to that shown in FIG. 2. The cylinder is filled with pressure medium, preferably a liquid such as oil or an oil-water emulsion, through the channel 16, air being removed through the channel 9 and a valve arrangement, not shown. When the cylinder is filled the air escape valve is closed and the pressure increased to the desired level previously stated. The end closures 7 and 8 are thus pushed outwardly against the yokes 26 and 27, which take up the forces acting on the end closures.

Figure 3A:
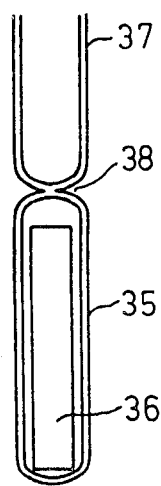
Figure 3B:
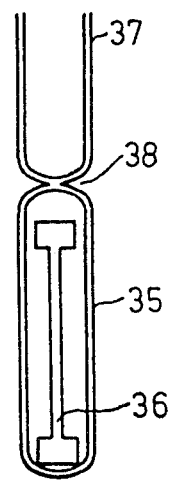

After compacting is completed the pressure is relaxed and the capsule with the preformed product is removed from the cylinder 2. The preformed product, which has a density 65% of the theoretical, is enclosed in a glass capsule 35 of Vycor or quartz glass, possibly after slight machining, as shown in FIGS. 3a and 3b. The preformed product is here designated 36. The capsule of plastic mentioned earlier, which is used for the compacting at room temperature, may be shaped to be similar to the body 36. The capsule 35 is larger than the product 36 so that there is a clearance between the body and the walls of the capsule. When the product 36 is placed in the capsule the capsule has no indentation. The capsule is placed in a furnace with a temperature of 1000° C. and evacuated there to a pressure of 0.1 Pa over a period of 8 hours, a vacuum pump being connected to the opening 37. The capsule is then sealed at this pressure by fusing the material of the capsule at 38. The capsule with the preformed product is then heated in the furnace to a temperature of 1250° C. so that the capsule material becomes sufficiently pliable to be easily shaped, and is then placed in the high-pressure chamber according to FIG. 4.

Figure 4:
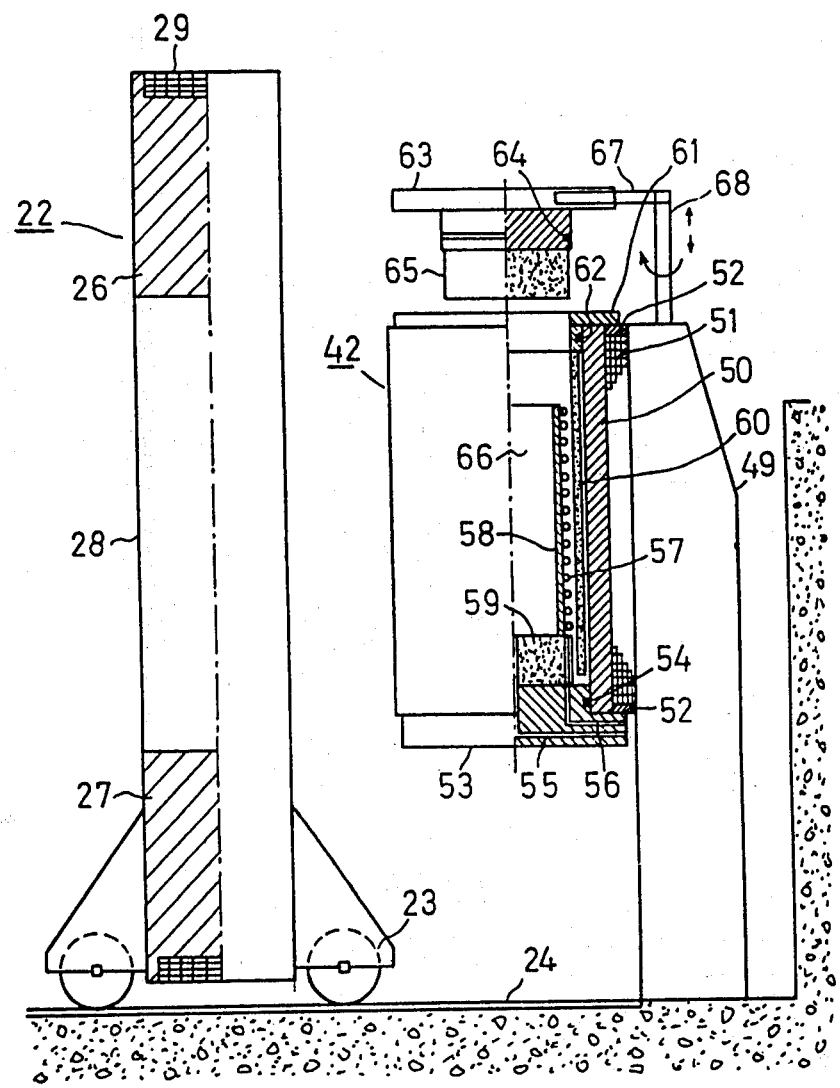

In FIG. 4, 22 designates a press stand of the same type as that shown in FIGS 1 and 2, which is movable between the position shown in the figure and a position in which the stand surrounds the high-pressure chamber 42. The high-ressure chamber 42 is supported by a stand 49 and contains a high-pressure cylinder comprising an inner tube 50, a surrounding, prestressed strip sheath 51 and end rings 52 keeping the strip sheath together and constituting suspension means by which the high-pressure chamber is secured to the stand 49. The chamber 42 has an end closure 53 which protrudes into the tube 50 of the high-pressure cylinder. In the end closure is a groove into which a sealing ring 54 is fitted, a channel 55 for the supply of a gaseous pressure medium, preferably argon or helium, and a channel 56 for cables to heating elements 57 for heating the furnace. The elements 57 are supported by a cylinder 58 resting on an insulating bottom 59 which protrudes into an insulating sheath 60. The upper end closure includes an annular part 61 with a seal 62 sealing against the tube 50. The sheath 60 is suspended in the part 61 and connected thereto in a gastight manner. The end closure also includes a lid 63 to seal the opening in the part 61 which is normally permanently located in the high-pressure cylinder. The lid is provided with a sealing ring 64 sealing against the inner surface of the part 61 and with an insulating lid 65 which, when the high-pressure chamber is closed, protrudes into the cylinder 60 and constitutes a part of the insulating shell surrounding the actual furnace chamber 66. The lid 63 is secured to a bracket 67 carried by an operating rod 68 which is pivotable and vertically movable. The yokes 26 and 27 take up the forces acting upon the end closure 53 and the lid 63 when pressure is applied in the furnace chamber, in the same way as is described for the means according to FIGS. 1 and 2.

When the capsule 35 shown in FIG. 3 is heated in the high-pressure furnace according to FIG. 4, the furnace is first heated to at least the same temperature as that to which the capsule 35 has been pre-heated in a conventional furnace. When the capsule has been placed in the furnace chamber 66, the lid 63 having been first raised and then lowered to seal the furnace chamber, the pressure is increased to 200 MPa and the temperature to 1740° C. and these conditions maintained for 7 hours when the desired density and sintering is obtained. The finished product is then cooled. Particularly if the silicon nitride body has a shape corresponding to that shown in FIG. 3b, it is advisable first to lower the pressure to about 0.5 MPa while maintaining the temperature. The power supply to the heating elements 57 is then reduced so that the temperature is decreased at a rate of about 500° C. per hour until the product has cooled to room temperature or a temperature at which it can be handled. When the product has been removed from the high-pressure furnace the glass capsule can be removed, for instance by blasting. If necessary, the finished product may also be subjected to grinding or polishing with a diamond tool. The flexural strength of the finished product is around 600 M/mm$^2$. Its density, 3.19 g/cm$^3$, exceeds 99.5% of the theoretical.

The method can of course be used for manufacturing bodies having any shape whatsoever and is particularly suited for use for bodies having extremely complicated shape.

We claim:

1. A method of manufacturing a body of silicon nitride having improved strength at elevated temperatures and substantially the same strength in all directions which comprises first enclosing a quantity of silicon nitride material in the form of a powder or a product preformed from such powder in a gas-tight casing comprising glass that is yelding at the temperatures used for sintering silicon nitride, and only thereafter heating said casing with the silicon nitride material encased thereby to a temperature of at least 1600° C. and subjecting the casing and thereby the silicon nitride material to isostatic pressing at a pressure of at least 100 MPa using a gaseous pressure medium to form said silicon nitride body within said casing.

2. A method as set forth in claim 1 wherein said isostatic pressing is conducted at a pressure of 150 to 1500 MPa.

3. A method as set forth in claim 2 wherein said isostatic pressing is conducted at a pressure of 200 to 300 MPa.

4. A method as set forth in claim 1 wherein said temperature is in the range of from 1600 to 1900° C.

5. A method as set forth in claim 4 wherein said temperature is in the range of from 1700 to 1800° C.

6. A method as set forth in claim 1 wherein the casing is evacuated prior to said isostatic pressing.

7. A method as set forth in claim 6 wherein said silicon nitride material is in the form of a predetermined shape created by the isostatic molding of a silicon nitride powder at a pressure of at least 100 MPa and at a temperature less than the temperature at which said powder will become sintered.

8. A method as set forth in claim 1 wherein said casing is formed of a glass having a high softening temperature.

9. A method as set forth in claim 8 wherein after said isostatic pressing said casing and its contents are cooled at a rate no greater than 1000° C. per hour.

10. A method as set forth in claim 9 wherein during said cooling the casing is subjected to a pressure of not greater than 10 MPa.

11. A method as set forth in claim 1 wherein said silicon nitride material contains no more than 0.6% by weight of impurities in the form of foreign metal oxides.

12. A method as set forth in claim 1 wherein said silicon nitride material is a silicon nitride powder which initially has a grain size of less than 100 $\mu$m and a crystal size of less than 5 $\mu$m.

* * * * *